(12) United States Patent
Ji et al.

(10) Patent No.: US 12,501,865 B2
(45) Date of Patent: Dec. 23, 2025

(54) AIR BLOWING DEVICE AND DETACHABLE FILTER ASSEMBLY FOR AIR BLOWING DEVICE

(71) Applicant: JIANGSU DONGCHENG TOOLS TECHNOLOGY CO., LTD., Jiangsu (CN)

(72) Inventors: Qiang Ji, Jiangsu (CN); Gongyuan Fan, Jiangsu (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 83 days.

(21) Appl. No.: 18/240,361

(22) Filed: Aug. 31, 2023

(65) Prior Publication Data

US 2024/0023498 A1   Jan. 25, 2024

Related U.S. Application Data

(63) Continuation of application No. PCT/CN2022/133041, filed on Nov. 19, 2022.

(30) Foreign Application Priority Data

Jun. 24, 2022   (CN) .......................... 202221613928.3

(51) Int. Cl.
*A01G 20/47*   (2018.01)
*F04D 29/70*   (2006.01)

(52) U.S. Cl.
CPC .......... *A01G 20/47* (2018.02); *F04D 29/703* (2013.01)

(58) Field of Classification Search
CPC ..... A01G 20/47; F04D 29/703; F04D 19/002; E01H 1/0809; E01H 1/12
See application file for complete search history.

(56) References Cited

U.S. PATENT DOCUMENTS

| | | | |
|---|---|---|---|
| 11,248,626 B2 * | 2/2022 | Shao | F04D 19/002 |
| 2003/0233730 A1 * | 12/2003 | Sanders | A01G 20/47 15/330 |

(Continued)

FOREIGN PATENT DOCUMENTS

| | | |
|---|---|---|
| CN | 108708339 A | 10/2018 |
| CN | 211368549 U | 8/2020 |

(Continued)

OTHER PUBLICATIONS

International Search Report, International Application No. PCT/CN2022/133041, mailed Mar. 23, 2023 (17 pages).

*Primary Examiner* — Aaron R Eastman

(57) ABSTRACT

An air blowing device, including an air duct portion, a motor assembly arranged inside the air duct portion, a fan assembly driven by the motor assembly, a mounting portion connected to a rear end of the air duct portion, and a connecting portion connecting the air duct portion with the mounting portion. The mounting portion and the air duct portion are spaced apart from each other and cooperatively define an opening space. The air blowing device further includes an air filter that is received in and completely fills the opening space to prevent foreign particles from entering an interior of the air duct portion, without sacrificing the amount of air intaken into the air blowing device, and thus the service life of the air blowing device may be extended. Due to a detachable structure, the air filter can be conveniently removed and cleaned after being used for a long time.

20 Claims, 4 Drawing Sheets

(56) References Cited

U.S. PATENT DOCUMENTS

| | | | |
|---|---|---|---|
| 2014/0230181 A1 | 8/2014 | Yamaoka et al. | |
| 2016/0195097 A1* | 7/2016 | Patrick | F04D 29/5806 |
| | | | 415/124.2 |
| 2018/0291930 A1* | 10/2018 | Pellenc | F04D 29/542 |
| 2019/0150688 A1* | 5/2019 | Bylund | A47L 5/14 |
| 2020/0137966 A1 | 5/2020 | Suzuki | |
| 2021/0259167 A1* | 8/2021 | Wang | F04D 29/541 |
| 2022/0183241 A1* | 6/2022 | Liu | F04D 25/08 |
| 2023/0220851 A1* | 7/2023 | Yamaoka | F04D 25/0673 |
| | | | 417/423.14 |

FOREIGN PATENT DOCUMENTS

| | | | | |
|---|---|---|---|---|
| CN | 212294492 U | | 1/2021 | |
| CN | 108708339 B | | 4/2021 | |
| CN | 215562239 U | | 1/2022 | |
| CN | 114059482 A | * | 2/2022 | A01G 20/47 |
| CN | 114059483 A | | 2/2022 | |

\* cited by examiner

AIR BLOWING DEVICE AND DETACHABLE FILTER ASSEMBLY FOR AIR BLOWING DEVICE

CROSS-REFERENCE TO RELATED APPLICATIONS

The present application is a continuation-application of International (PCT) Patent Application No. PCT/CN2022/133041 filed on Nov. 19, 2022, which claims foreign priority to Chinese Patent Application No. 202221613928.3, filed on Jun. 24, 2022, the contents of which are herein incorporated by reference in their entireties.

TECHNICAL FIELD

The present disclosure relates to the field of garden tools, and in particular to an air blowing device and a detachable filter assembly for an air blowing device.

BACKGROUND

An air blowing device may be a type of gardening equipment in which a motor drives a fan to rotate at high speed to draw outside air into the housing, pressurize it, and then blow it outward. The air blowing device may be widely used in home operations, such as leaf removal. The air blowing device may include a longitudinally extending housing, a motor assembly arranged inside the housing, a fan assembly connected to the motor assembly, an air inlet opened at an end of the housing and an air outlet opened at the other end of the housing. Area of the air inlet in the related art may be relatively small, resulting in less air intaken into the air blowing device, thus affecting the efficiency of the air blowing device. In addition, the air inlet of the related art may be integrated in the housing. After a long period of work, foreign particles accumulated in the air inlet may be hard to be cleaned.

Therefore, the air blowing device needs to be improved to overcome the shortcomings in the related art.

SUMMARY OF THE DISCLOSURE

One embodiment of the present disclosure targeted at the current technical problems may be performed as follows: an air blowing device, including: an air duct portion, a motor assembly arranged inside the air duct portion, a fan assembly driven by the motor assembly, a mounting portion connected to a rear end of the air duct portion, and a connecting portion connecting the air duct portion with the mounting portion. The mounting portion and the air duct portion may be spaced apart from each other and cooperatively define an opening space. The connecting portion may include a first connecting part disposed at a top part of the connecting portion and a second connecting part disposed at a bottom part of the connecting portion. The opening space may be defined by the first connecting part, the second connecting part, the air duct portion, and the mounting portion cooperatively. The air blowing device may further include an air filter fixedly arranged between the mounting portion and the air duct portion, and the air filter may be received in and fill the opening space.

A detachable filter assembly for an air blowing device may further be provided. The detachable filter assembly may include an air duct portion, a mounting portion connected to an end of the air duct portion, a connecting part connecting the air duct portion with the mounting portion, and an air filter fixedly arranged between the mounting portion and the air duct portion. The mounting portion and the air duct portion may be spaced apart from each other and cooperatively define an opening space. The opening space may be defined by the connecting part, the air duct portion, and the mounting portion cooperatively. The air filter may be received in and block the opening space.

BRIEF DESCRIPTION OF THE DRAWINGS

The following drawings may provide further details to describe some embodiments of the present disclosure.

DETAILED DESCRIPTION

The present disclosure may be described in further details along with the drawings and some embodiments.

The terms used to explain the present disclosure are only for the purpose of describing particular embodiments and are not intended to set limits on the present disclosure. Terms, such as "above", "below", "front", "back", "left", "right", are used to indicate relative positions or directions within the specific drawings and aim to facilitate and simplify the description of the present disclosure, rather than implying or dictating that the referred device/element must be located at the specific directions or be structured and performed in the specific directions, thus should not be understood as limitation to the present disclosure.

Figure 1:
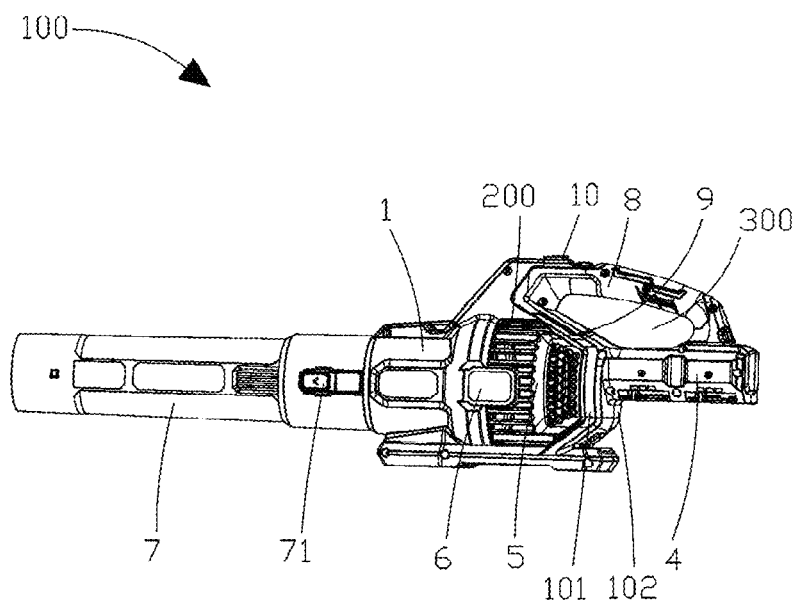
FIG. 1 is the perspective view of the overall structure of an air blowing device.
Figure 2:
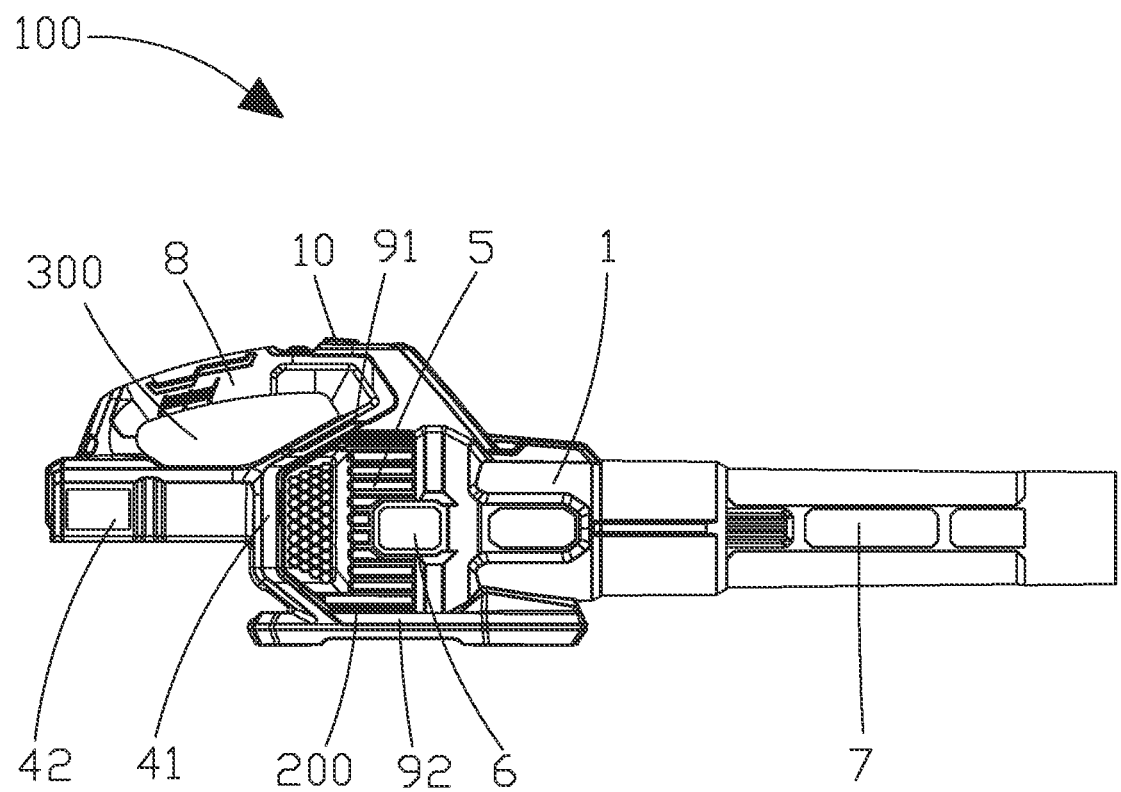
FIG. 2 is the schematic view of the air blowing device shown in FIG. 1 from a different angle.
Figure 3:
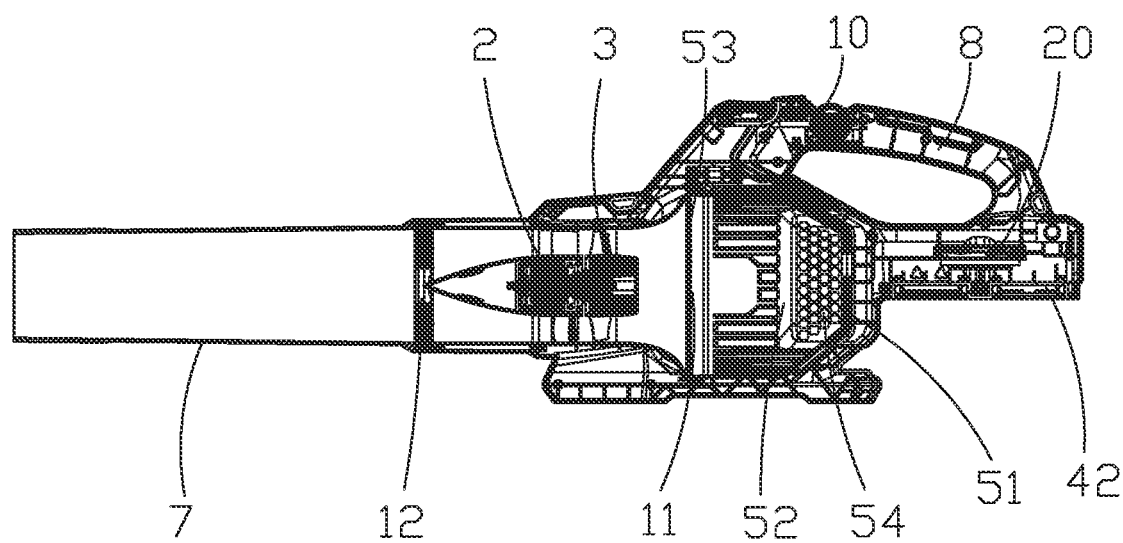
FIG. 3 is the sectional view of the air blowing device shown in FIG. 1.

As shown in FIG. 1 to FIG. 3, according to the present disclosure, an air blowing device 100 may be provided. The air blowing device 100 may be widely used in technical fields, including but not limited to horticulture. The air blowing device 100 may include an air duct portion 1 extending along a front-rear direction, a motor assembly 2 arranged inside the air duct portion 1, a fan assembly 3 driven by the motor assembly 2, a control assembly 20 connected to the motor assembly 2, a mounting portion 4 connected to a rear end of the air duct portion 1, a connecting portion 9 connecting the air duct portion 1 with the mounting portion 4, an air pipe 7 arranged at a front end of the air duct portion 1, a grip portion 8 arranged at a top of the air blowing device 100, and a switch assembly 10 arranged on the grip portion 8. The mounting portion 4 and the air duct portion 1 may be spaced apart from each other and cooperatively define an opening space 200. The opening space 200 may increase the amount of air intaken into the air blowing device 100. Air at an outside of the air blowing device 100 may flow into the air blowing device 100 through the opening space 200. The intaken air may further enter, driven by the motor assembly 2 and the fan assembly 3, the air duct portion 1, and may be blown out of the air blowing device 100 after being pressurized by the motor assembly 2 and the fan assembly 3.

In the present embodiment, two sub-shells 101 and 102 may combine with each other to form a housing of the air blowing device, and the two sub-shells 101 and 102 are symmetrical to each other, about a central plane.

In the present embodiment, the air duct portion 1 may define an air inlet 11 located near the opening space 200 and an air outlet 12 located away from the opening space 200. The motor assembly 2 and the fan assembly 3 may both be located between the air inlet 11 and the air outlet 12.

As shown in FIG. 1, given that a side of the air duct portion 1 is the front and a side of the mounting portion 4 is the rear, the air pipe 7, extending forward from the front end of the air duct portion 1, may be detachably arranged with the air duct portion 1 through a snap assembly 71.

As shown in FIG. 2, given that a side of the grip portion 8 is the top and the opposite side of the grip portion 8 is the bottom, the connecting portion 9 may include a first connecting part 91 disposed at a top part of the connecting portion 9 and a second connecting part 92 disposed at a bottom part of the connecting portion 9. The opening space 200 may be defined by the first connecting part 91, the second connecting part 92, the air duct portion 1, and the mounting portion 4 cooperatively. As the opening space 200 may be located at each of two sides of the central plane, the air at the outside of the air blowing device 100 may flow into the air blowing device 100 through the opening space 200 on each of the two sides.

In the present embodiment, an end of the grip portion 8 may connect to the first connecting part 91, and the other end of the grip portion 8 may connect to the mounting portion 4. A space 300 may be defined by the grip portion 8, the first connecting part 91, and the mounting portion 4, cooperatively. A user may conveniently grasp the grip portion 8 by putting fingers through the space 300.

As shown in FIG. 3, the switch assembly 10 may be located at a top of the grip portion 8 and may connect to the control assembly 20 and may control an operation of the motor assembly 2 through the control assembly 20. The switch assembly 10 may facilitate the user to control and adjust an output parameter of the air blowing device 100.

In the present embodiment, the mounting portion 4 may include a mounting panel 41 extending along an up-down direction and a mounting base 42 extending from an end face of the mounting panel 41 in a direction away from the air duct portion 1. The grip portion 8 is connected to a rear end of the mounting base 42, and the connecting portion 9 is connected to the mounting panel 41. A battery pack (not shown) may be detachably arranged in the mounting base 42, and the air blowing device 100 may be powered by the battery pack.

Furthermore, the control assembly 20 may be housed inside the mounting base 42.

As shown in FIG. 1 to FIG. 3, the air blowing device 100 may include an air filter 5 fixedly arranged between the mounting portion 4 and the air duct portion 1, and air filter 5 may be received in and completely fill the opening space 200, and the air at the outside of the air blowing device 100 may enter the opening space 200 through the air filter 5. By receiving the air filter 5 in the opening space 200, any foreign particle may be effectively prevented from entering an interior of the air duct part 1, without sacrificing the amount of air intaken into the air blowing device 100, and thus the service life of the air blowing device 100 may be extended. Due to a detachable structure, the air filter 5 may be easily detached from the air blowing device 100 and cleaned after being used for a long time.

In the present embodiment, the air filter 5 may be compatible with the opening space 200 as a shape of the air filter 5 may match to a surface of the opening space 200 receiving the air filter 5.

Figure 4:
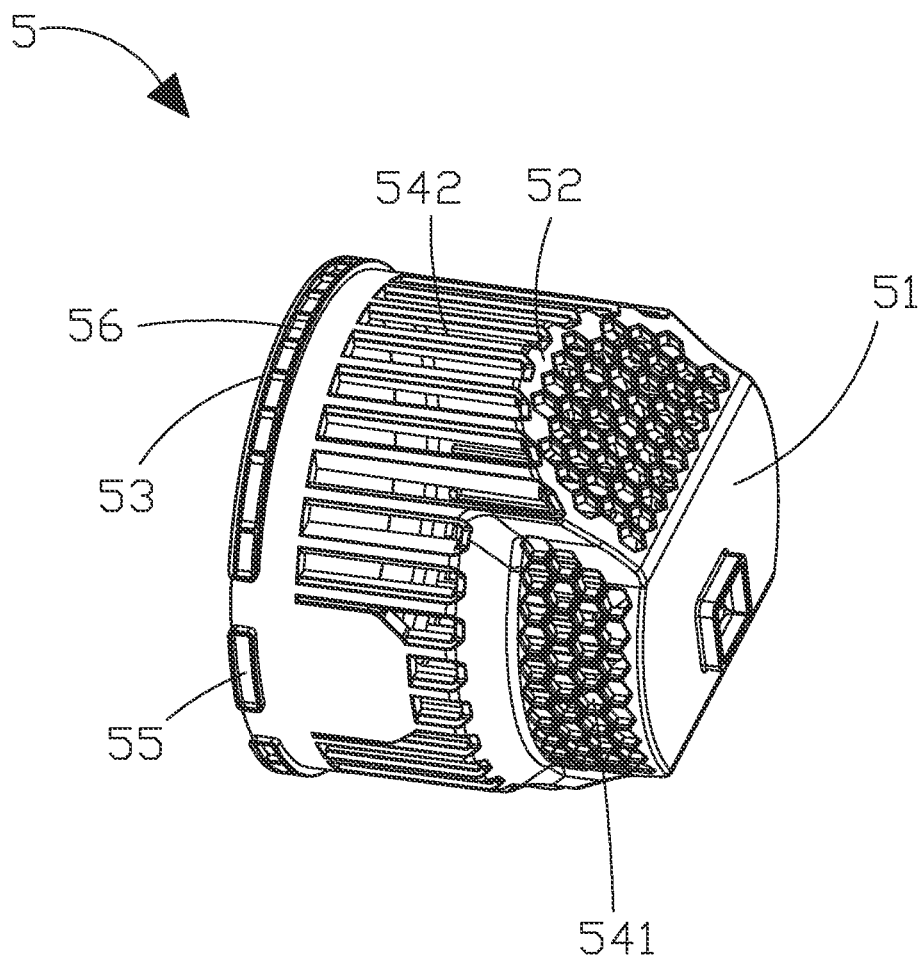
FIG. 4 is the perspective view of an air filter in the air blowing device shown in FIG. 1.

As shown in FIG. 4, the air filter 5 may include a base 51 attached to the mounting panel 41, a side wall 52 protruding from an outer periphery of the base 51 toward the air duct portion 1, an opening 53 defined by the side wall 52, at least one passage 54 extending through the side wall 52, and a first snap portion 56 located at an outer periphery of the side wall 52 and adjacent to the opening 53. The opening 53 may be located at an end of the side wall 52, while the base 51 may be located at the other end of the side wall 52. The air at the outside of the air blowing device 100 may enter the air filter 5 through the at least one passage 54 and may exit the air filter 5 through the opening 53.

In the present embodiment, the opening 53 may be located inside the air inlet 11 so that air discharged from the opening 53 may directly enter the air duct portion 1 through the air inlet 11, and the efficiency of the air blowing device 100 may be effectively enhanced.

In the present embodiment, the at least one passage 54 may include a plurality of first passages 541 located near the mounting portion 4 and a plurality of second passages 542 located near the air duct portion 1. Area of opening of each of the plurality of first passages 541 may be smaller than area of opening of each of the plurality of second passages 542. Specifically, the plurality of first passages 541 may be arranged in shape of honeycomb, while each of the plurality of second passages 542 may be defined into an elongated hole extending along the front-rear direction. The plurality of second passages 542 may be arranged at intervals along the outer periphery of the side wall 52. Defining the at least one passage 54 into two different shapes may improve appearance of air filter 5 aesthetically.

Furthermore, the first snap portion 56 may be arranged to occupy the entire outer periphery of the side wall 52. The air duct portion 1 may have a second snap portion (not labeled) corresponding to the first snap portion 56. The air filter 5 may be installed to the air duct portion 1 by snapping the first snap portion 56 with the second snap portion (not labeled).

As shown in FIG. 1 and FIG. 2, the air blowing device 100 may further include at least one connecting block 6, configured to connect the air duct portion 1 to the air filter 5. In the present embodiment, the number of the at least one connecting block 6 may be two. The two connecting blocks 6 may be located on opposite sides of a circumference of the air duct portion 1. Specifically, the air filter 5 may include a third snap portion 55 extending in a direction away from the opening 53 from the outer periphery of the side wall 52, and the connecting block 6 may be snapped with the third snap portion 55.

Furthermore, the at least one connecting block 6 may be integrally formed on the air duct portion 1.

By receiving the air filter 5 inside the opening space 200, foreign particles may be prevented from entering the interior of the air duct portion 1, without sacrificing the amount of air intaken into the air blowing device 100, and thus the service life of the air blowing device 100 may be extended. Due to a detachable structure, the air filter 5 may be easily detached from the air blowing device 100 and cleaned after being used for a long time.

The above-mentioned embodiments may illustrate only some implementations of the present disclosure. Any ordinary skilled in the art may easily understand that various alternatives may be performed without departing from concept and extent of the present disclosure. Therefore, the scope of the present disclosure shall be subject to the claims.

What is claimed is:

1. An air blowing device, comprising: an air duct portion, a motor assembly arranged inside the air duct portion, a fan assembly driven by the motor assembly, a mounting portion connected to a rear end of the air duct portion, and a connecting portion connecting the air duct portion with the mounting portion; wherein the mounting portion and the air duct portion are spaced apart from each other and cooperatively define an opening space; the connecting portion comprises a first connecting part disposed at a top part of the connecting portion and a second connecting part disposed at a bottom part of the connecting portion; the opening space is defined by the first connecting part, the second connecting part, the air duct portion, and the mounting portion cooperatively; the air blowing device further comprises an air filter detachably arranged between the mounting portion and the air duct portion, and the air filter is received in and fills the opening space;

wherein the air blowing device further comprises two sub-shells, the two sub-shells are combined with each other symmetrically about a central plane to form a housing of the air blowing device, and the air filter is arranged between the two sub-shells.

2. The air blowing device according to claim 1, wherein a shape of the air filter matches to a surface of the opening space receiving the air filter.

3. The air blowing device according to claim 1, wherein the air duct portion comprises an air inlet near the opening space and an air outlet away from the opening space; both the motor assembly and the fan assembly are located between the air inlet and the air outlet.

4. The air blowing device according to claim 3, wherein the air filter comprises a base adjacent to the mounting portion, a side wall protruding from an outer periphery of the base toward the air duct portion, and an opening defined by the side wall; the opening is located at an end of the side wall, and the base is located at the other end of the side wall.

5. The air blowing device according to claim 4, wherein the air filter further comprises at least one passage extending through the side wall; the air at the outside of the air blowing device is capable of entering the air filter through the at least one passage and exiting the air filter through the opening.

6. The air blowing device according to claim 5, wherein the opening is communicated with the air inlet and located at an end of the air duct portion away from the mounting portion.

7. The air blowing device according to claim 5, wherein the at least one passage further comprises a plurality of first passages near the mounting portion and a plurality of second passages near the air duct portion; area of opening of each of the plurality of first passages is smaller than area of opening of each of the plurality of second passages.

8. The air blowing device according to claim 4, wherein the air filter further comprises a first snap portion located at an outer periphery of the side wall and adjacent to the opening, and the air duct portion further comprises a second snap portion corresponding to the first snap portion; the air filter is connected to the air duct portion by snapping the first snap portion with the second snap portion.

9. The air blowing device according to claim 1, further comprising at least one connecting block configured to connect the air duct portion with the air filter; wherein the number of the at least one connecting block is two and the at least one connecting block are located on opposite sides of a circumference of the air duct portion.

10. The air blowing device according to claim 1, further comprising a grip portion arranged at a top of the air blowing device and a switch assembly arranged on the grip portion, wherein an end of the grip portion is connected to the first connecting part, and the other end of the grip portion is connected to the mounting portion.

11. The air blowing device according to claim 10, wherein the mounting portion comprises a mounting panel expanded along an up-down direction, the up-down direction is extending perpendicular to a direction extending from the mounting portion to the air duct portion, a mounting base extended from an end face of the mounting panel in a direction away from the air duct portion; a control assembly is housed in the mounting base and configured to control the motor assembly.

12. The air blowing device according to claim 1, wherein the air duct portion further comprises an air pipe extending from a front end of the air duct portion, the front end of the air duct portion is an end away from the mounting portion; the air pipe comprises a snap assembly to detachably connect to the air duct portion.

13. A detachable filter assembly, comprising an air duct portion, a mounting portion connected to an end of the air duct portion, a connecting part connecting the air duct portion with the mounting portion, and an air filter detachably arranged between the mounting portion and the air duct portion; wherein the mounting portion and the air duct portion are spaced apart from each other; the connecting part, the mounting portion, and the air duct portion cooperatively define an opening space; the air filter is received in and blocks the opening space;

wherein the air duct portion comprises an air inlet near the opening space and an air outlet away from the opening space; the air filter comprises a base, a side wall protruding from an outer periphery of the base toward the air duct portion, and an opening defined by enclosing an end of the side wall away from the base; and the opening is located inside the air inlet, enabling air discharged from the opening to directly enter the air duct portion through the air inlet.

14. The detachable filter assembly according to claim 13, wherein the base is adjacent to the mounting portion and the air filter further comprises at least one passage extending through the side wall.

15. The detachable filter assembly according to claim 14, wherein the at least one passage comprises a plurality of first passages located near the mounting portion and a plurality of second passages located near the air duct portion.

16. The detachable filter assembly according to claim 15, wherein area of opening of each of the plurality of first passages is smaller than area of opening of each of the plurality of second passages; the plurality of first passages are arranged in shape of honeycomb, and each of the plurality of second passages is defined into an elongated hole extending along a front-rear direction; the plurality of second passages are arranged at intervals along the outer periphery of the side wall, wherein the front-rear direction is a direction extending from the air duct portion towards the mounting portion.

17. The detachable filter assembly according to claim 14, wherein the air filter further comprises a first snap portion arranged on an outer periphery of the side wall and being disposed adjacent to the opening; and a third snap portion extending, in a direction away from the opening, from the outer periphery of the side wall.

18. The detachable filter assembly according to claim 17, wherein the air duct portion comprises at least one connecting block and a second snap portion corresponding to the first snap portion.

19. The detachable filter assembly according to claim 18, wherein the air filter is installed to the air duct portion by snapping the first snap portion with the second snap portion; the number of the at least one connecting block is two and the at least one connecting block are located on opposite sides of a circumference of the air duct portion to snap with the third snap portion.

20. An air blowing device, comprising: an air duct portion, a motor assembly arranged inside the air duct portion, a fan assembly driven by the motor assembly, a mounting portion connected to a rear end of the air duct portion, and a connecting portion connecting the air duct portion with the mounting portion; wherein the mounting portion and the air duct portion are spaced apart from each other and cooperatively define an opening space; the connecting portion comprises a first connecting part disposed at a top part of the connecting portion and a second connecting part disposed at a bottom part of the connecting portion; the opening space is defined by the first connecting part, the second connecting part, the air duct portion, and the mounting portion cooperatively; the air blowing device further comprises an air filter fixedly arranged between the mounting portion and the air duct portion, and the air filter is received in and fills the opening space and a shape of the air filter matches to a surface of the opening space receiving the air filter.

\* \* \* \* \*